(12) United States Patent
Rossi et al.

(10) Patent No.: US 12,152,331 B2
(45) Date of Patent: Nov. 26, 2024

(54) LAUNDRY TREATING APPARATUS

(71) Applicant: Electrolux Appliances Aktiebolag, Stockholm (SE)

(72) Inventors: Giuseppe Rossi, Porcia (IT); Andrea Vanin, Porcia (IT); Nicola Reid, Porcia (IT); Costantino Maguolo, Porcia (IT); Ivan Azzalin, Porcia (IT); Andrea Contarini, Sacile (IT)

(73) Assignee: Electrolux Appliances Aktiebolag, Stockholm (SE)

(*) Notice: Subject to any disclaimer, the term of this patent is extended or adjusted under 35 U.S.C. 154(b) by 1039 days.

(21) Appl. No.: 17/056,655

(22) PCT Filed: May 21, 2018

(86) PCT No.: PCT/EP2018/063259
§ 371 (c)(1),
(2) Date: Nov. 18, 2020

(87) PCT Pub. No.: WO2019/223850
PCT Pub. Date: Nov. 25, 2019

(65) Prior Publication Data
US 2021/0207307 A1    Jul. 8, 2021

(51) Int. Cl.
*D06F 37/06* (2006.01)
*D06F 25/00* (2006.01)
(Continued)

(52) U.S. Cl.
CPC .............. *D06F 37/06* (2013.01); *D06F 34/10* (2020.02); *D06F 37/20* (2013.01); *H02J 50/12* (2016.02);
(Continued)

(58) Field of Classification Search
CPC .......... D06F 37/06; D06F 34/10; D06F 37/20; D06F 25/00; D06F 37/30; D06F 2103/16;
(Continued)

(56) References Cited

U.S. PATENT DOCUMENTS

| 1,902,193 A | 3/1933 | Stoddard |
| 3,878,721 A | 4/1975 | Nath |

(Continued)

FOREIGN PATENT DOCUMENTS

| CN | 101079569 A | 11/2007 |
| CN | 101153456 A | 4/2008 |

(Continued)

OTHER PUBLICATIONS

International Search Report and Written Opinion for International Application No. PCT/EP2018/063259, dated Feb. 5, 2019, 10 pages.

(Continued)

*Primary Examiner* — Jessica Yuen
(74) *Attorney, Agent, or Firm* — Bradley Arant Boult Cummings LLP

(57) ABSTRACT

A laundry treating apparatus having a cabinet, a drum rotatably housed inside the cabinet, a wireless power transmitter unit associated to the cabinet separately from the drum and arranged for wireless transmitting electric power to a wireless power receiver unit mounted in/on the drum, and one or more electromechanical actuators mounted in/on the drum and power supplied by the wireless power receiver unit.

28 Claims, 9 Drawing Sheets

(51) Int. Cl.
    *D06F 34/10*     (2020.01)
    *D06F 37/20*     (2006.01)
    *D06F 37/30*     (2020.01)
    *D06F 103/16*     (2020.01)
    *H02J 50/12*     (2016.01)
    *H02J 50/40*     (2016.01)

(52) U.S. Cl.
    CPC .............. *H02J 50/40* (2016.02); *D06F 25/00* (2013.01); *D06F 37/30* (2013.01); *D06F 2103/16* (2020.02)

(58) Field of Classification Search
    CPC ......... D06F 23/02; D06F 23/06; H02J 50/12; H02J 50/40
    See application file for complete search history.

(56) References Cited

U.S. PATENT DOCUMENTS

| | | | |
|---|---|---|---|
| 5,318,705 | A | 6/1994 | Pellerin |
| 5,813,253 | A | 9/1998 | Uhlin |
| 8,336,338 | B2 | 12/2012 | Cimetta et al. |
| 9,347,165 | B2 | 5/2016 | Kim et al. |
| 9,951,465 | B1 | 4/2018 | Herschler et al. |
| 11,168,430 | B2 | 11/2021 | Park et al. |
| 2003/0061842 | A1 | 4/2003 | Ryu et al. |
| 2004/0118168 | A1 | 6/2004 | Woo et al. |
| 2004/0134094 | A1 | 7/2004 | Hahn et al. |
| 2005/0097926 | A1 | 5/2005 | Kim et al. |
| 2005/0210603 | A1 | 9/2005 | Houser et al. |
| 2006/0081018 | A1 | 4/2006 | Kim |
| 2007/0113595 | A1 | 5/2007 | Harwood et al. |
| 2008/0053166 | A1 | 3/2008 | Lim |
| 2008/0317688 | A1 | 12/2008 | Doyle et al. |
| 2011/0154678 | A1 | 6/2011 | Lee |
| 2011/0162224 | A1 | 7/2011 | Bae et al. |
| 2012/0192362 | A1 | 8/2012 | Lee et al. |
| 2013/0314897 | A1 | 11/2013 | Dal Ben et al. |
| 2014/0355247 | A1 | 12/2014 | Ius et al. |
| 2014/0366589 | A1 | 12/2014 | Park et al. |
| 2015/0225887 | A1 | 8/2015 | Schulze |
| 2016/0330572 | A1 | 11/2016 | Kropp et al. |
| 2017/0096760 | A1 | 4/2017 | Borlin et al. |
| 2017/0247828 | A1 * | 8/2017 | Tsuji ..................... D06F 37/065 |
| 2018/0266030 | A1 | 9/2018 | Kwon et al. |
| 2020/0263343 | A1 | 8/2020 | Liu et al. |

FOREIGN PATENT DOCUMENTS

| | | |
|---|---|---|
| CN | 201047684 Y | 4/2008 |
| CN | 101400842 A | 4/2009 |
| CN | 201325442 Y | 10/2009 |
| CN | 103261506 A | 8/2013 |
| CN | 104131438 A | 11/2014 |
| CN | 104781462 A | 7/2015 |
| CN | 106245279 A | 12/2016 |
| CN | 106835621 A | 6/2017 |
| CN | 107541888 A | 1/2018 |
| CN | 107541905 A | 1/2018 |
| CN | 207812118 U | 9/2018 |
| CN | 109737073 A | 5/2019 |
| CN | 110318220 A | 10/2019 |
| DE | 4104450 A1 | 8/1992 |
| EP | 0351671 A1 | 1/1990 |
| EP | 0503999 A1 | 9/1992 |
| EP | 0942093 A1 * | 9/1999 |
| EP | 1167609 A1 | 1/2002 |
| EP | 2270272 A1 | 1/2011 |
| EP | 2302125 A1 | 3/2011 |
| EP | 2604740 A1 | 6/2013 |
| EP | 2719818 A1 | 4/2014 |
| EP | 2955263 A1 | 12/2015 |
| EP | 2990519 A1 | 3/2016 |
| EP | 3378982 A1 | 9/2018 |
| EP | 3388569 A1 | 10/2018 |
| EP | 3441512 A1 | 2/2019 |
| EP | 3594402 A1 | 1/2020 |
| FR | 2695657 A1 | 3/1994 |
| JP | 0433689 A | 2/1992 |
| JP | 2005021505 A | 1/2005 |
| JP | 2005177331 A | 7/2005 |
| JP | 2007159892 A | 6/2007 |
| JP | 2017127402 A | 7/2017 |
| KR | 100798779 B1 | 1/2008 |
| KR | 20130114482 A | 10/2013 |
| WO | 9000641 A1 | 1/1990 |
| WO | 2007063368 A1 | 6/2007 |
| WO | 2009061325 A1 | 5/2009 |
| WO | 2013022164 A2 | 2/2013 |
| WO | 2016182540 A1 | 11/2016 |
| WO | 2018045955 A1 | 3/2018 |
| WO | 2018091717 A1 | 5/2018 |
| WO | 2018184734 A1 | 10/2018 |
| WO | 2018236155 A1 | 12/2018 |
| WO | 2018223850 A1 | 11/2019 |
| WO | 2019223849 A1 | 11/2019 |

OTHER PUBLICATIONS

Chinese Office Action with Search Report for Chinese Application No. 201980103036.3, dated May 18, 2023 with translation, 21 pages.
English Translation of Chinese Office Action with Search Report for Chinese Application No. 202080052935.8, dated May 24, 2023, 14 pages.
Shao et al., "Mechanical Noise and Its Control, 1st Edition", Feb. 28, 1997, pp. 325-327, South China University of Technology Press.
Chinese Office Action with Search Report for Chinese Application No. 201880093070.2, dated Aug. 31, 2023 with translation, 21 pages.
Non Final Office Action for U.S. Appl. No. 17/777,121, mailed Sep. 22, 2023, 20 pages.
Non Final Office Action for U.S. Appl. No. 17/777,124, mailed Sep. 22, 2023, 19 pages.
Chinese Office Action with Search Report for Chinese Application No. 201980102188.1, dated Apr. 26, 2023 with translation, 24 pages.
International Search Report and Written Opinion for International Application No. PCT/EP2020/053358, dated May 11, 2020, 9 pages.
International Search Report and Written Opinion for International Application No. PCT/EP2017/079819, dated Feb. 23, 2018—9 pages.
International Search Report and Written Opinion for International Application No. PCT/EP2018/063258, dated Feb. 4, 2019, 10 pages.
International Search Report and Written Opinion for International Application No. PCT/EP2020/025278, dated Sep. 30, 2020, 15 pages.
International Search Report and Written Opinion for International Application No. PCT/EP2019/081666, dated Feb. 13, 2020, 11 pages.
International Search Report and Written Opinion for International Application No. PCT/EP2019/081667, dated Feb. 5, 2020, 10 pages.
International Search Report and Written Opinion for International Application No. PCT/EP2019/081664, dated Feb. 5, 2020, 10 pages.
Korean Request for the Submission of an Opinion for Korean Application No. 10-2020-7033385, dated Mar. 30, 2023 with translation, 19 pages.
Chinese Office Action with Search Report for Chinese Application No. 201980102232.9, dated Apr. 26, 2023 with translation, 28 pages.
Chinese Office Action for Chinese Application No. 201880093598.X, dated Sep. 5, 2022 with translation, 19 pages.

(56) References Cited

OTHER PUBLICATIONS

Korean Request for the Submission of an Opinion for Korean Application No. 10-20207032957, dated Sep. 17, 2022 with translation, 12 pages.

* cited by examiner

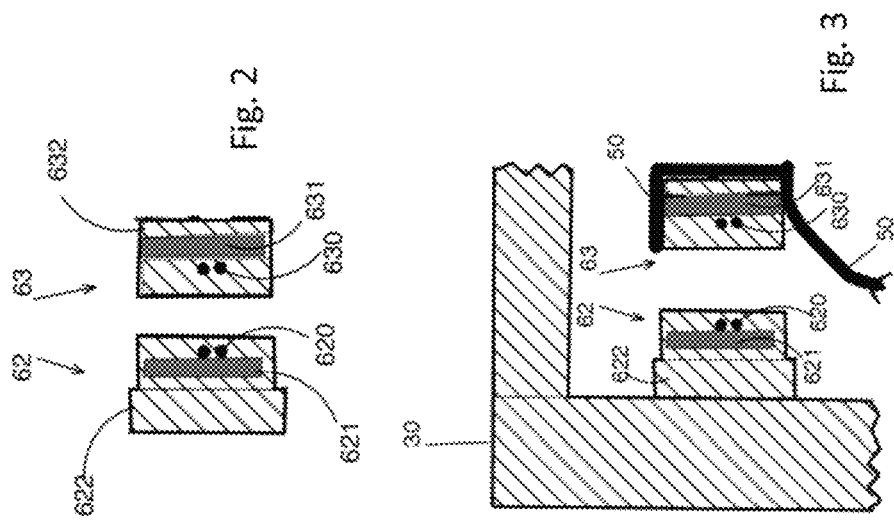
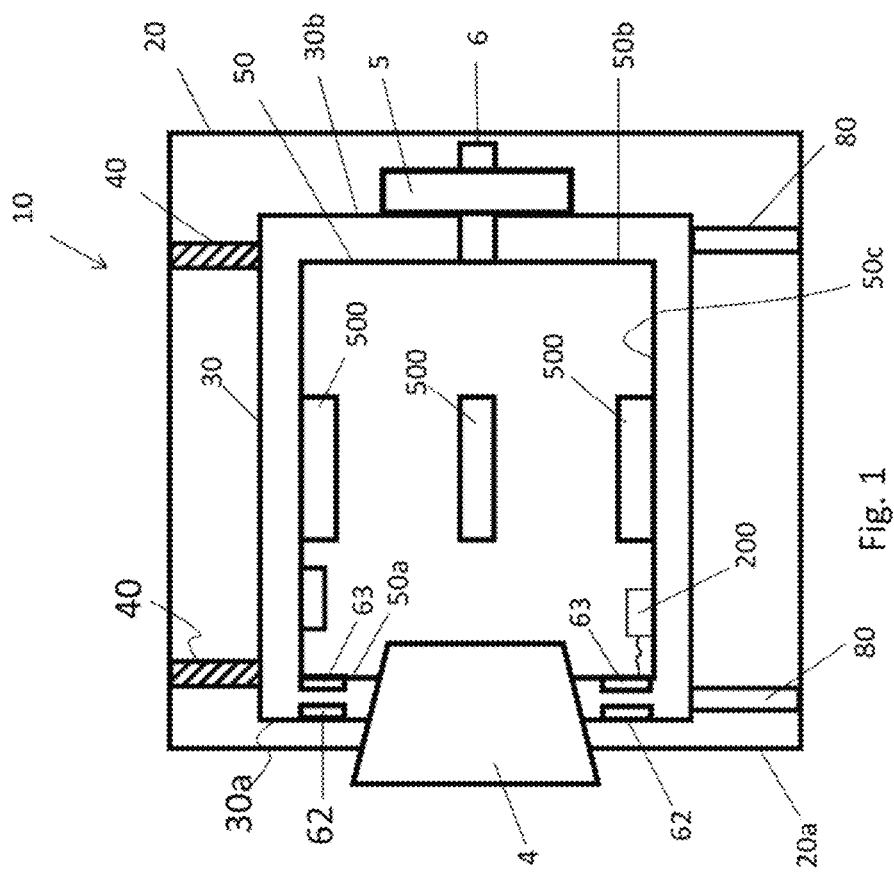

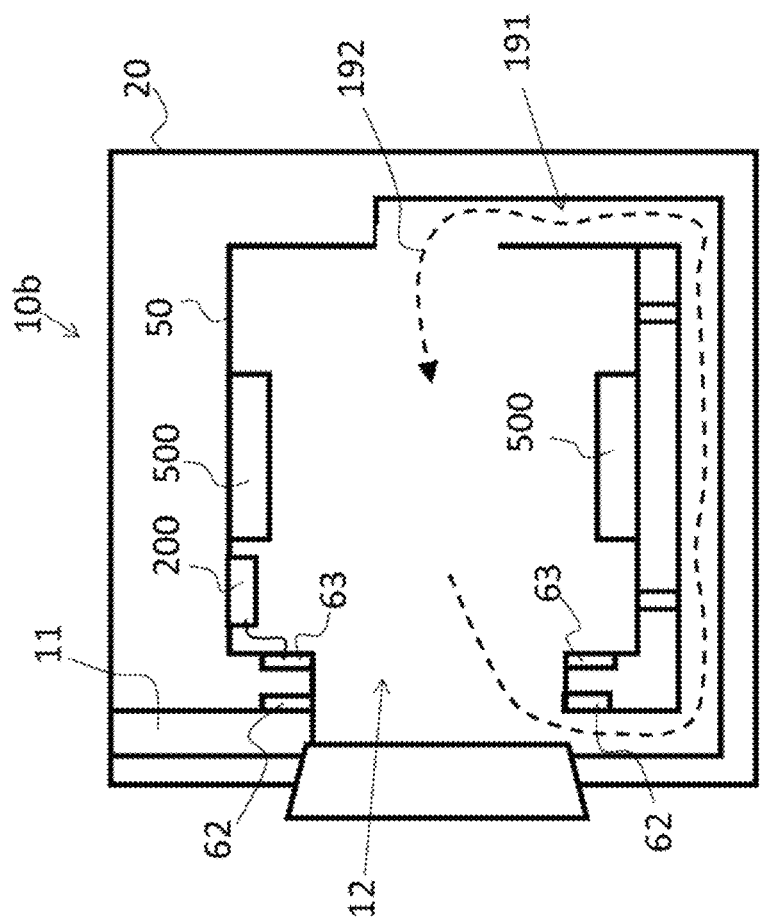

LAUNDRY TREATING APPARATUS

This application is a U.S. National Phase application of PCT International Application No. PCT/EP2018/063259, filed May 21, 2018, which is incorporated by reference herein.

The invention relates to a laundry treating apparatus, for example a laundry washing machine (called also washing machine), a laundry washer-drier (called also washer-drier), a tumble drier.

Traditional laundry treating apparatuses, for example washing machines, washer-driers, tumble driers, typically comprise a cabinet or housing in which a drum is rotatably mounted.

In known washing machine or washer-driers, the cabinet also houses a washing tub, typically suspended to the cabinet through springs and dumpers, in which the drum is rotatably contained.

In known tumble driers, the tub is not provided, and the drum is typically rotatably supported in the cabinet, generally by rollers pivoted to a supporting structure static with respect to the cabinet.

In known laundry treatment apparatuses there is the problem that, since the drum is rotatable, it is difficult transmitting electrical energy from the "not rotatable" parts of the laundry treatment appliance (e.g. the cabinet) to the internal of the drum; this layout limits the possibility to mount in the drum devices for treating the laundry which require to be electrically powered.

SUMMARY

It is an object of the present invention to provide a laundry treating apparatus which does not present above mentioned problems, and which allows to treat the laundry in a more dedicated and effective way.

Applicant has found that, by providing the drum of a washing machine, or washer drier, or tumble drier with one or more electromechanical actuators power supplied by a wireless power receiver unit mounted in/on the drum for receiving electric power from a wireless power transmitter unit associated to the cabinet separately from the drum, it is possible treating the laundry in a more dedicated, localized, and effective way.

In fact, the possibility to mount electromechanical actuators in/on the drum, and to wireless power supply these actuators from the external of the drum by a wireless energy transmission, opens the possibility to apply to the laundry a variety of treatments which allows to treat it in a more effective and dedicated way.

For example, the electromechanical actuators allow applying to the laundry specific and localized mechanic actions which improve its washing and/or rinsing and/or spin drying; or an electromechanical actuator can generate an air stream directly within the drum for making the drying more uniform.

It is underlined that the wireless power transmitter unit, being positioned in a "not rotating" part of the laundry treating apparatus, can be easily connected, for example by wires, to the electrical system of the apparatus, so as to be power supplied. Electric power is therefore easily wireless supplied to the rotating drum.

In particular, above object is solved by a laundry treating apparatus comprising a cabinet, a drum rotatably housed inside the cabinet, a wireless power transmitter unit associated to said cabinet separately from said drum and arranged for wireless transmitting electric power to a wireless power receiver unit mounted in/on said drum; the laundry treating apparatus comprises one or more electromechanical actuators mounted in/on said drum and power supplied by said wireless power receiver unit.

Preferably, the one or more electromechanical actuators are wired connected to the wireless power receiver unit.

Advantageously, the wireless power transmitter unit is electrically connected to an electric system of the laundry treating apparatus. Preferably, the wireless power transmitter unit is wired electrically connected to the electric system of the laundry treating apparatus.

In an advantageous embodiment, the laundry treating apparatus is a washing machine or washer-drier, and the cabinet houses a tub in which said drum is rotatably mounted, wherein said wireless power transmitter unit is mounted in/on said tub.

In a preferred embodiment, the power transmitter unit and the power receiver unit are positioned, one opposite to the other, fixed respectively to the tub and to the drum, parallel in radial direction.

In a further advantageous embodiment, the laundry treating apparatus is a tumble drier, the cabinet comprises an air circuit for circulating heated air within said drum, and said wireless power transmitter unit is mounted in/on a static or fixed part (for example a frontal flange) of said cabinet.

In an advantageous embodiment, the laundry treating apparatus comprises a rotating element rotatably mounted inside said drum, wherein at least one of said one or more electromechanical actuators is arranged for rotating said rotating element with respect to said drum. Preferably, at least one of said one or more electromechanical actuators comprises an electric motor for rotating said rotating element with respect to said drum, said electric motor being mounted in/on said drum. More preferably, the rotating element faces a rear wall of said drum.

In an advantageous embodiment, the rotating element comprises an agitating disk rotatably mounted inside the drum, concentrically to the latter. Preferably, the agitating disk comprises one or more agitating blades protruding from its surface facing a central region of said drum.

In a further advantageous embodiment, the rotating element comprises a bowl-shaped element rotatably mounted inside said drum, concentrically to the latter. Preferably, the bowl-shaped element comprises one or more agitating ribs radially protruding from its lateral surface towards its central region.

In a preferred embodiment of the invention, the drum comprises one or more lifters protruding from its lateral surface towards the internal of said drum.

In a further advantageous embodiment, at least one of said one or more lifters is movable with respect to said drum, and at least one of said one or more electromechanical actuators is associated to said at least one movable lifter for moving the latter with respect to said drum.

Preferably, the at least one electromechanical actuator associated to said at least one movable lifter for moving the latter with respect to said drum is housed within said at least one movable lifter. More preferably, the at least one electromechanical actuator associated to said at least one movable lifter for moving the latter with respect to said drum comprises an electric motor, and/or a pneumatic device.

Preferably, said at least one movable lifter can be moved with respect to said drum by a translation and/or a rotation.

More preferably, at least one lifter can be moved with six degrees of freedom with respect to the drum.

In a further advantageous embodiment, at least one of said one or more lifters has a shape and/or volume that can be selectively modified by at least one of said one or more electromechanical actuators.

Preferably, the at least one electromechanical actuator arranged for selectively modifying the shape and/or volume of said at least one lifter is housed within the latter.

Still preferably, said at least one electromechanical actuator arranged for selectively modifying the shape and/or volume of said at least one lifter comprises a linear actuator and/or a pneumatic actuator, and or pump and/or a valve and/or an endless screw.

In an advantageous embodiment, the at least one lifters having a shape and/or volume that can be selectively modified by at least one of said one or more electromechanical actuators has a hollow telescopic structure, and said at least one electromechanical actuator is arranged for selectively actuating the telescopic extraction/insertion of said telescopic lifter.

In a different advantageous embodiment, the at least one lifters having a shape and/or volume that can be selectively modified by at least one of said one or more electromechanical actuators has a hollow structure and an elastically deformable external wall that can be selectively and reversibly enlarged by said least one electromechanical actuator. Preferably, said at least one electromechanical actuator is arranged for selectively filling or emptying said at least one lifters having a shape and/or volume that can be selectively modified, with a fluid, so as to selectively increase/decrease its volume.

In a further advantageous embodiment, at least one of said one or more lifters has a hollow shape and an at least partially perforated or air permeable surface, and at least one of said one or more electromechanical actuators comprises a fan or blower housed within said hollow lifter and arranged for generating an air flow from the internal to the external of said at least one lifter.

In an advantageous embodiment, the wireless power transmitter unit comprises a transmission coil generating a magnetic field and the wireless power receiver unit comprises a reception coil generating power from the magnetic field generated by the transmission coil and supplying the generated power to said one or more electromechanical actuators.

Preferably, the transmission coil and the reception coil are aligned, centered and parallel in radial direction.

Preferably, the transmission coil and the reception coil have a common radius dimension approximately equal to the drum external radius and are distanced in axial direction by a distance lower than their radius.

More preferably, the transmission coil and the reception coil are distanced in axial direction by a distance lower than 10 cm. Even more preferably, the transmission coil and the reception coil are distanced in axial direction by a distance lower than 5 cm.

Advantageously, the wireless power receiver unit comprises a receiver magnetic shielding member, and the wireless power transmitter unit comprises a transmission magnetic shielding member.

Preferably, in case of a washing machine or washer-drier, which are provided with a tub, the wireless receiver magnetic shielding member is positioned between the reception coil and the drum side, and the transmission magnetic shielding member is positioned between the transmission coil and the tub side.

Preferably, the receiver shielding member is positioned on the opposite side of the reception coil with respect to the wireless power transmitter unit.

Preferably, the transmission shielding member is positioned on the opposite side of the wireless transmission coil with respect to the power receiver unit.

In an advantageous embodiment, the wireless power receiver comprises at least two reception coils and the one or more electromechanical actuators comprise at least two electromechanical actuators, each reception coil electrically supplying a distinct electromechanical actuator.

In an advantageous embodiment, the laundry treating apparatus comprises at least one, possibly also two or more, temperature sensing element(s) positioned in the drum and suitable to generate measurement data, the measurement data being wireless transferred to the appliance control unit by an interface unit fixed to the drum and supplied by a said wireless power receiver unit.

Preferably, the interface unit, supplied by the wireless power receiver unit and transferring wireless the measured data to the appliance control unit, is fixed to the drum external side.

Preferably, the interface unit collects temperature measurement data and additional measured parameters, which are wireless transferred to the appliance control unit.

BRIEF DESCRIPTION OF THE DRAWINGS

Other advantages and features of a laundry treating apparatus according to the present invention will be clear from the following detailed description, provided only as a non limitative example, in which:

FIG. 1 is a sectional view of a first possible embodiment of a laundry treating apparatus according to this invention, in particular a washing machine.

FIG. 2 is a sectional view of a detail of a possible embodiment of a wireless transmitter power unit and a wireless receiver power unit according to the invention.

FIG. 3 is a sectional view showing more in detail an advantageous embodiment of the fixation of the wireless power transmitter unit to the tub and the wireless power receiver unit to the drum.

FIG. 15 is a schematic sectional view of a further possible embodiment of a laundry treating apparatus according to this invention, in particular a tumble drier.

DETAILED DESCRIPTION OF EXEMPLARY EMBODIMENTS

Figure 5:
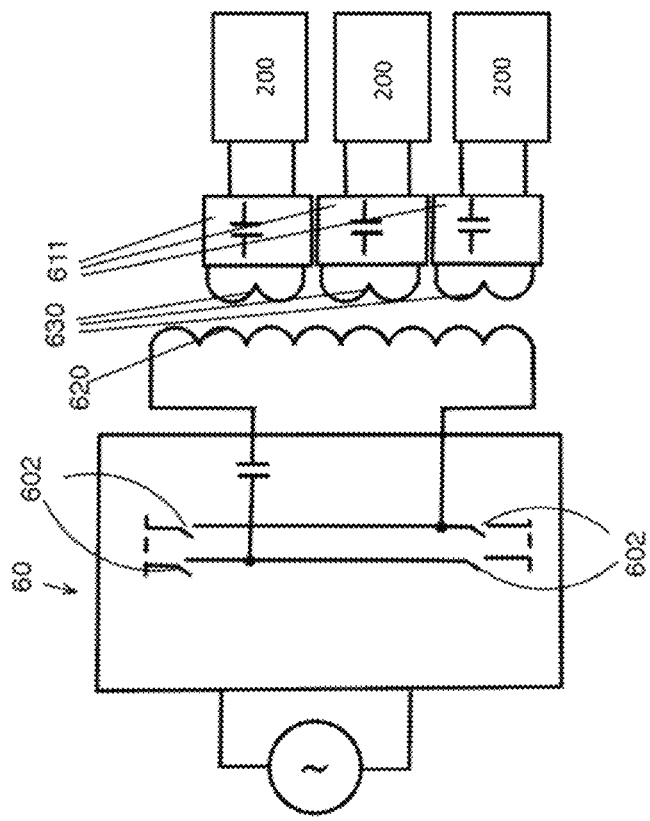
FIG. 5 is block diagram of another embodiment of a power supply circuit of the electromechanical actuator(s).

In the figures same parts are indicated with the same reference numbers.

A laundry treating apparatus 10 according to the invention is schematically illustrated in FIG. 1; in this advantageous example, the laundry treating apparatus is a laundry washing machine, called also washing machine, but it is clear that the present invention can be applied also to a laundry washer-drier (i.e. a washing machine which can also dry the laundry), and to a tumble drier, without any substantial modification.

Advantageously the laundry washing machine 10 of FIG. 1 is of the front-loading type; it is however clear that the invention can be applied, without any substantial modification, also to a top-loading washing machine.

With reference to FIG. 1, the washing machine 10 according to the invention comprises an external casing 20 in which frontal wall 20a an access opening is preferably obtained, preferably connected the external casing 20 via a flexible bellows, not illustrated.

Preferably, a loading/unloading door 4 allows the access to a washing tub 30, advantageously suspended to the cabinet 20 through springs 40 and dumpers 80.

The washing tub 30 advantageously contains a rotary perforated drum 50 in which the laundry to be washed, not illustrated, can be loaded.

The drum 50 is preferably provided with a rotating shaft 6, protruding from its rear wall 50b, and supported by one or more bearings, not illustrated, provided in the rear wall 30b of the tub 30; the shaft 6, and therefore the drum 50, is rotated preferably by a first electric motor 5, preferably, but not necessarily, fixed directly to the rear wall 30b of the tub 30, or connected to the shaft 6 by a belt-pulley assembly, not illustrated.

The washing machine 1 preferably comprises a water inlet circuit, not illustrated, adapted to feed water and washing/rinsing products into the tub 30; the washing machine 1 is also advantageously provided with a water outlet circuit, also not illustrated, adapted for draining washing/rinsing products from the machine. The water inlet and outlet circuits of a washing machine are well known in the art, and therefore will not be described in detail.

A wireless power transmitter unit 62 is associated to the cabinet 20, separately from the drum 50; in the advantageous embodiment illustrated in FIG. 1, in which the laundry treating apparatus comprises a tub 30, the wireless power transmitter unit 62 is advantageously fixed to the tub 30, preferably to the internal wall of the tub 30 facing the drum 50.

As it will be better explained in the following, in a different advantageous embodiment of a laundry treating apparatus according to the invention, the laundry treating apparatus is not provided with a tub (this is the case, for example, of tumble drier), in which case the wireless power transmitter can be mounted in a static or fixed part of the cabinet 20.

The laundry treating apparatus 10 is also provided with a wireless power receiver unit 63, mounted in/on the drum 50; the wireless power transmitter unit 62 is arranged for wireless transmitting electric power to the wireless power receiver unit 63.

The wireless power transmitter unit 62 is electrically connected, preferably wired, to the electric system, not illustrated, of the laundry treating apparatus 10; the electric system is connectable, for example, to the electric mains, not illustrated, of the building where the apparatus 10 is installed, so as to be power supplied by such mains.

In the advantageous embodiment of FIG. 1, the wireless power transmitter unit 62 and the wireless power receiver unit 63 are positioned, one opposite to the other, fixed respectively to the tub 30 and to the drum 50, parallel in radial direction.

In the embodiment of FIG. 1, the wireless power receiver unit 63 is fixed to a front wall 50a of the drum 50, advantageously corresponding to its opening side, and the wireless power transmitter unit 62 is fixed to the front wall 30a of the tub 30, facing the wireless power receiver unit 63.

In another advantageous embodiment (for example the embodiments illustrated in FIGS. 7 to 14), the wireless power transmitter unit 62 is fixed to the rear wall 30b of the tub 30, preferably facing the drum 50, and the wireless power receiver unit 63 is fixed to the rear wall 50b of the drum 50, facing the tub 30.

The wireless receiver power unit 63 is electromagnetically coupled to the wireless power supply transmitter unit 62.

Preferably, the wireless power transmitter unit 62 and the wireless power receiver unit 63 are annular shaped (e.g. they are or comprise electrically conductive coils); more preferably, they are centred with the drum 50 centre, and mounted radially parallel respectively on the tub 30 (if provided) and on the drum 50.

The power receiver unit 63 is advantageously fixed parallel in radial direction opposite the power transmitter unit 62.

Preferably, but not necessary, the drum 50 is provided with one or more lifters 500, protruding from its lateral surface 50c towards the internal of the drum 50.

In FIG. 2 a sectional view of a preferred embodiment of the wireless power transmitter unit 62 and wireless receiver unit 63 is schematically shown.

The power transmitter unit 62 has preferably a transmission coil 620 which is electromagnetically coupled to a reception coil 630 of the power receiver unit 63. They are preferably integrated into an enclosing material 622, 632 and they have, preferably, respectively magnetic sheets 621 and 631 that provide the side magnetic shield to the sides external to the coupling area, and improve the magnetic coupling between the two coils 620 and 630.

Preferably, the wireless power transmitter unit 62 and the wireless power receiver unit 63 are parallel, centred with respect to the drum 50 centre in order to maximize the electromagnetic coupling, as shown for example in FIG. 3.

In the advantageous example of FIG. 3, the wireless power receiver unit 63 could be fixed in a U shaped opening formed in the drum 50 external periphery, while the power transmitter unit could have its side 622 fixed with screw or glued to the tub 30 wall.

Advantageously, the laundry treating apparatus 10 comprises a control unit 60.

The laundry treating apparatus 10 comprises one or more electromechanical actuators 200, mounted in/on the drum 50 and power supplied by the wireless power receiver unit 63.

Figure 4:
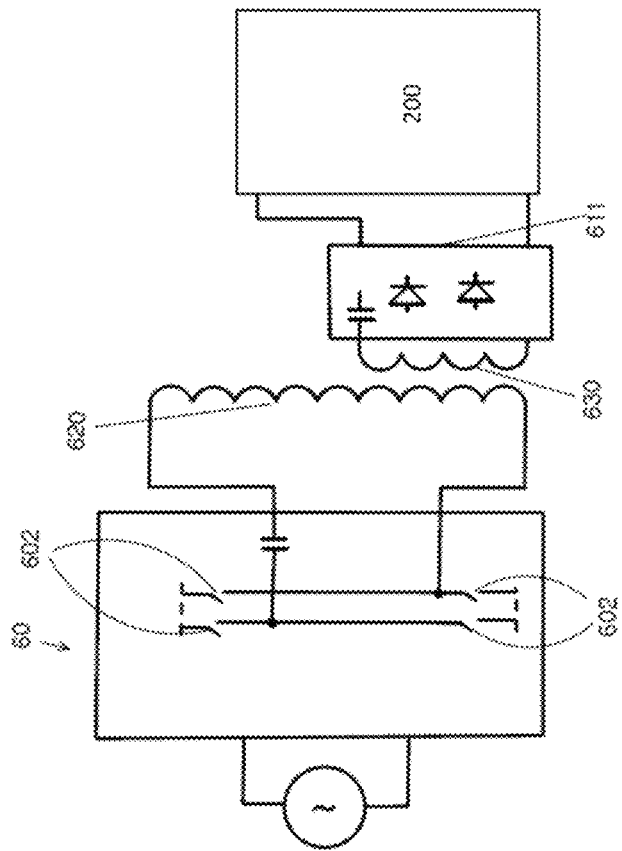
FIG. 4 is a block diagram of a first embodiment of a power supply circuit of the electromechanical actuator(s).

As shown in the advantageous example of FIG. 4, in the appliance control unit 60 an oscillating voltage can be generated by switching elements 602, that supply the transmission coil 620 of the wireless power transmitter unit 62 coupled to the reception coil 630 of the wireless power receiver unit 63. The voltage induced in the coil 630 can be preferably rectified and conditioned in a coil interface block 611, and can be preferably brought, preferably with wires, to one more electromechanical actuators 200, only schematically illustrated in FIG. 4, mounted in the drum 50.

Preferably, the components of the interface block 611 could be integrated in the power receiver unit 63.

The control unit 60 preferably manages the laundry treating apparatus 10 operations, for example controlling the drum motor rotation speed as well as the other actuators comprised in the laundry treating apparatus, for example a drain pump and a user interface (not illustrated).

Another advantageous embodiment is shown in FIG. 5 where the power receiver unit 63 has multiple coils 630, each coil 630 supplying, through its own interface block 611, one or more respective electromechanical actuators 200.

Figure 6:
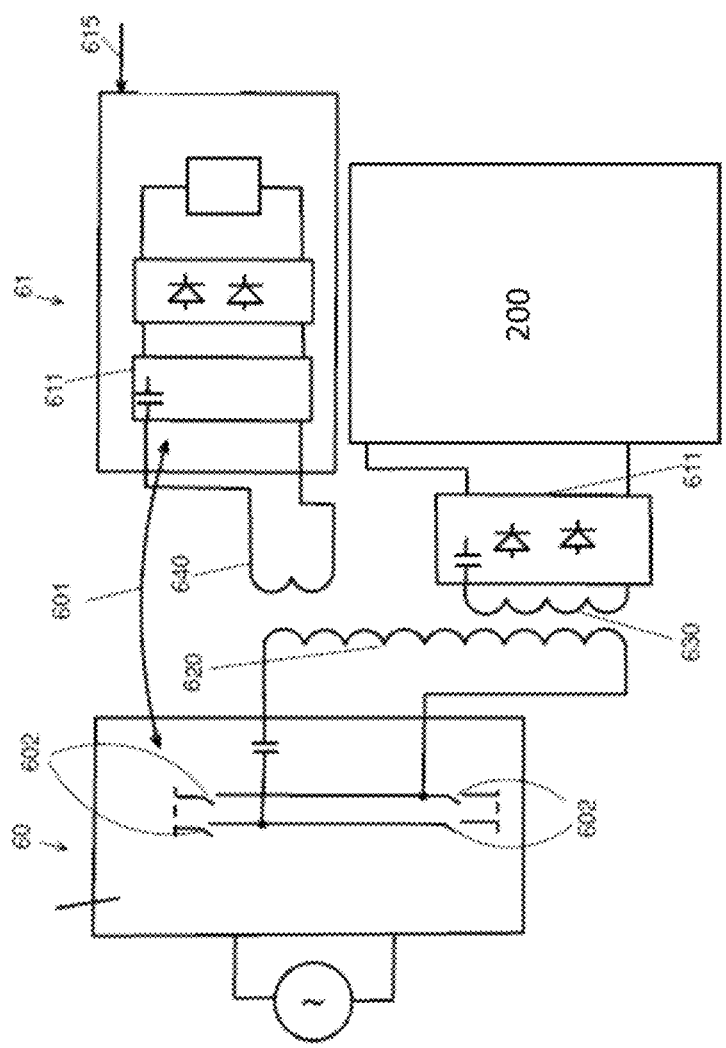
FIG. 6 is block diagram of another embodiment of a power supply circuit of the electromechanical actuator(s), including an interface unit.

A further advantageous embodiment is shown in FIG. 6. In this embodiment, on the drum 50 there is fixed an interface unit 61, together with the power receiver unit 63 and the one or more electromechanical actuators 200. The interface unit 61 can be supplied by a dedicated reception coil 640 of the receiver unit 63, as shown in FIG. 6, or it could be connected in parallel to the reception coil 630 supplying the electromechanical actuator(s) 200.

The interface unit 61 has preferably a wireless connection 601 to transfer measurement data to the appliance control unit 60.

For example, the interface unit 61 could transfer to the appliance control unit 60 measured temperatures 615 from temperature measurement element or elements positioned, for example, in the lifters 500.

This would allow to design washing cycles based on the real temperature measured in the drum 50, not extrapolated by the temperature measured in the tub 30 that at the beginning of the cycle can be very different. Moreover this would allow heating the clothes during the spinning implementing a simple long drying cycle.

The interface unit 61 could be for example positioned integrated in the isolating support material 632 of the power receiver unit 63. Or it could be positioned, for example, on the drum 50 rear wall 50b, preferably in a central region of the latter. The biggest advantage of this position 55 is that the interface unit 61 components are not subject to the high centrifugal forces.

In the following, different possible advantageous embodiments of electromechanical actuators 200 according to the invention will be described.

It is underlined that in the present application, the expression "electromechanical actuator" has to be interpreted as a device that, powered by electric energy, can move a body; this expression includes for example electric motors, electric pumps, electric fans, electro-valves, electro pneumatic actuators, etc.

FIGS. 7 to 14 describe advantageous embodiments of a laundry treating apparatus according to the invention, provided with a tub 30 in which the drum 50 is rotatably mounted; in this case, the laundry treating apparatus is therefore a laundry washing machine, or a washer-drier.

Anyway it is underlined that the same advantageous solutions illustrated in FIGS. 7 to 14 can be applied also to a tumble drier 10b, for example the one illustrated in FIG. 15. The tumble drier 10b is provided with an air circuit, schematically indicated with number 191, adapted for circulating a stream of hot air 192 within the drum 50, so as to dry the laundry contained therein. The air circuit of a tumble direr is well known in the art, and therefore will not be described in detail.

In relation to the present invention, the main difference with respect to a washing machine or washer drier is that a tumble drier 10b is not provided with a tub, and therefore the wireless power transmitter unit 62 is applied to a static or fixed part of the cabinet 20, for example to a frontal flange 11 facing the inlet opening 12 of the drum 50, or to a different portion of the cabinet 20, or of an element fixed, or anyway associated, to the cabinet 20 and facing the drum 50, in particular facing the wireless power receiver unit 62 mounted in the latter.

Also in the case of a tumble drier 10b, the drum 50 can be provided with one or more lifters 500.

The description of the embodiments of FIGS. 7 to 14 can therefore be applied also to the tumble drier 10b of FIG. 15, with the only difference that in a tumble drier the wireless power transmitter unit 62 is applied to a static or fixed part of the cabinet 20 instead of to a tub.

In the advantageous embodiments illustrated in FIGS. 7 to 14, the wireless power transmitter unit 62 is preferably mounted on the rear wall 30b of the tub 30, and the wireless power receiver unit 63 is mounted on the rear wall 50b of the drum 50, so as to face the wireless power transmitter unit 62; anyway the wireless power transmitter unit 62 and the wireless power receiver unit 63 could be mounted respectively in the front wall 30a of the tub 30 and in the front wall 50a of the drum 50, without any substantial modification to the invention. The same consideration is valid also to the tumble 10b drier of FIG. 15, mutatis mutandis.

In the advantageous embodiments illustrated in FIGS. 7 to 10, a rotating element 13 is provided, rotatably mounted inside the drum 50; in this case, at least one electromechanical actuators 200 is arranged for rotating this rotating element 13 with respect to the drum.

The electromechanical actuator 200 can comprise for example a rotating electric motor 201, preferably mounted within the drum 50 and electrically powered by the wireless power receiver unit 63.

Preferably the electric motor 201 is wired connected to the wireless power receiver unit 63.

Figure 8:
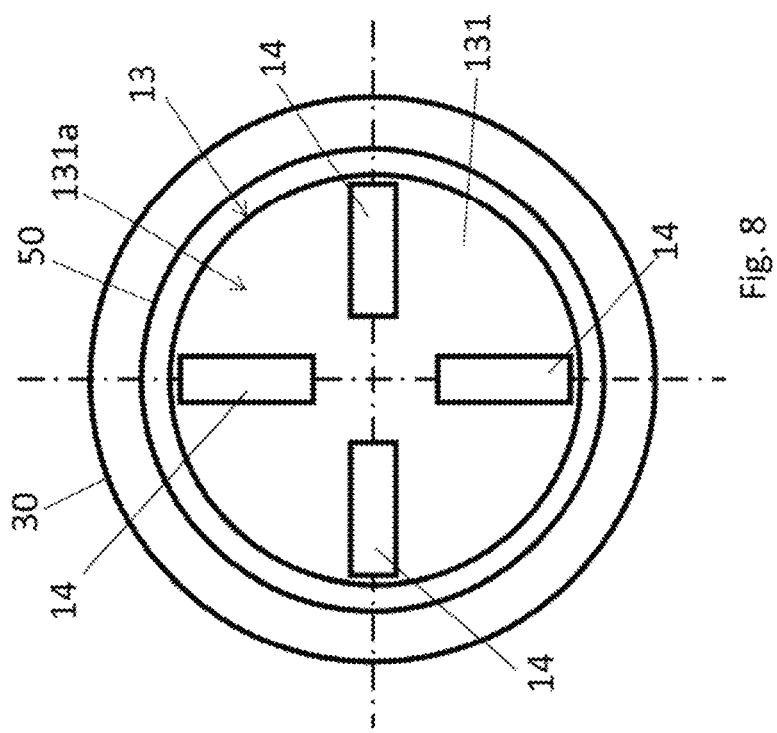
FIG. 8 is a cross-section taken along surface VIII-VIII of FIG. 7.
Figure 7:
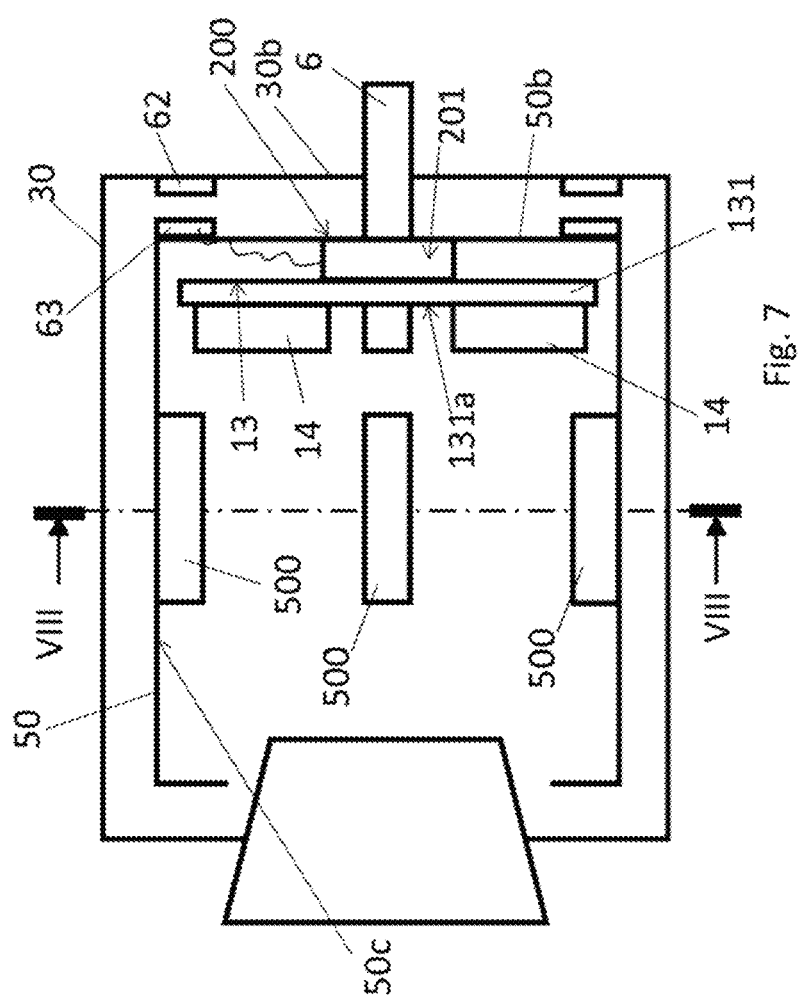
FIG. 7 is a schematic cross section of a tub and a drum of an advantageous embodiment of a laundry treating apparatus according to the invention.

In the advantageous embodiment illustrated in FIGS. 7 and 8, the rotating element 13 comprises an agitating disk 131 rotatably mounted inside the drum 50, concentrically to the latter, and preferably facing its rear wall 50b.

The agitating disk 131 may comprise one or more agitating blades 14 protruding from its surface 131a facing the central region of the drum 50.

Figure 10:
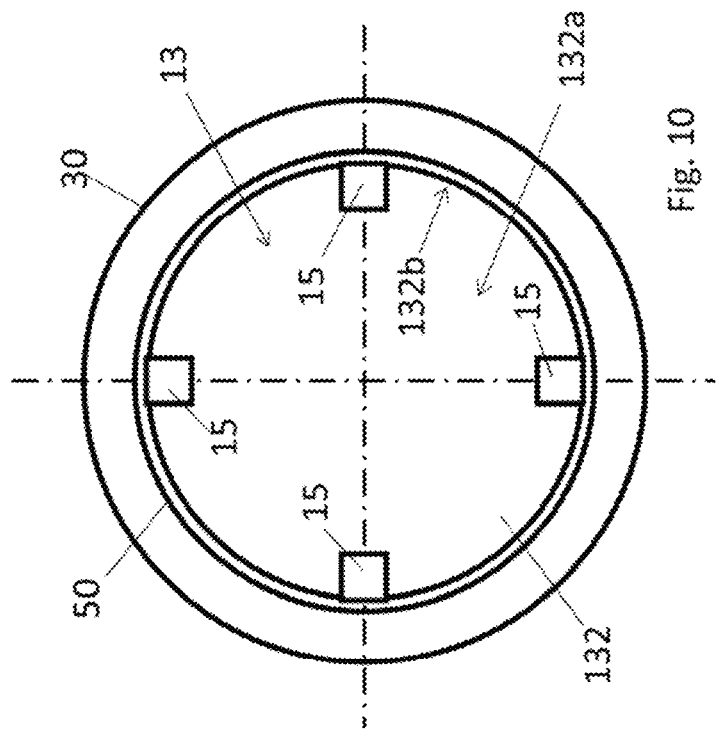
FIG. 10 is a cross-section taken along surface X-X of FIG. 9.
Figure 9:
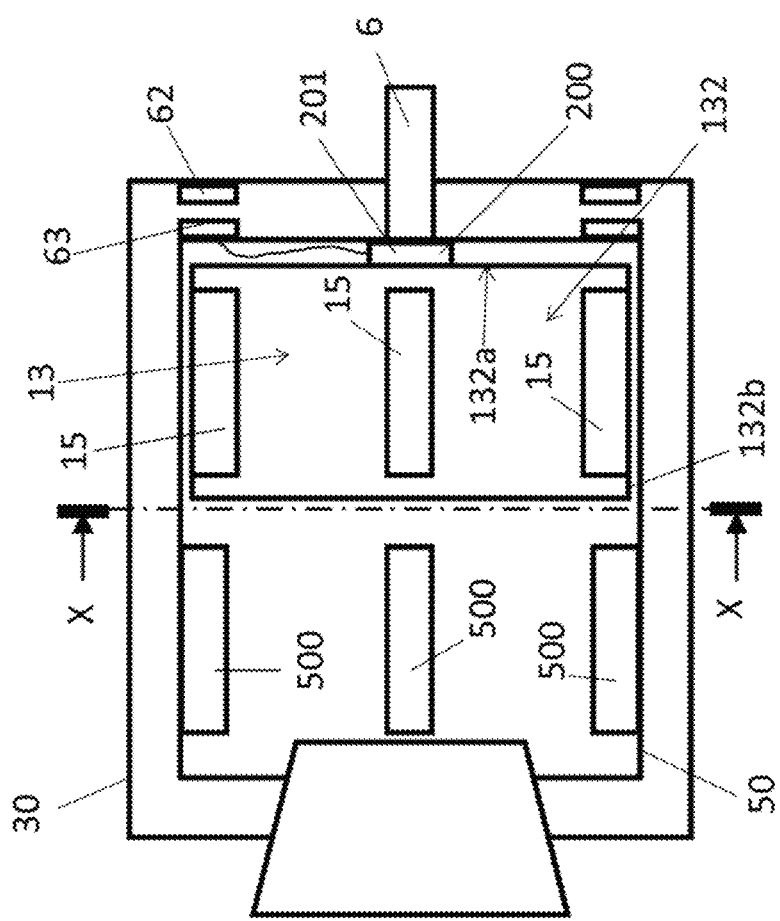
FIG. 9 is a schematic cross section of a tub and a drum of a further advantageous embodiment of a laundry treating apparatus according to the invention.

In a further advantageous embodiment, illustrated in FIGS. 9 and 10, the rotating element 13 advantageously comprises a bowl-shaped element 132 rotatably mounted inside the drum 50, concentrically to the latter, and, preferably facing its rear wall 50b. In this advantageous embodiment, the bowl-shaped element 132 comprises one or more agitating ribs 15 radially protruding from its lateral surface 132b towards its central region.

The rotating element 13 (e.g. the disk 131, or the bowl-shaped element 132), that can be rotated by the motor 201 with respect to the drum 50, allows increasing the mechanical agitation of the laundry, which can be helpful, for example, in the case of a washing machine, for improving the washing-rinsing performances, and in case of a tumble drier for better distributing the laundry within the drum 50 and obtaining a more uniform drying.

It has already been mentioned that the drum 50, both in case of a washing machine or washer-drier, and in case of a tumble drier, can advantageously comprise one or more lifters 500.

Figure 12:
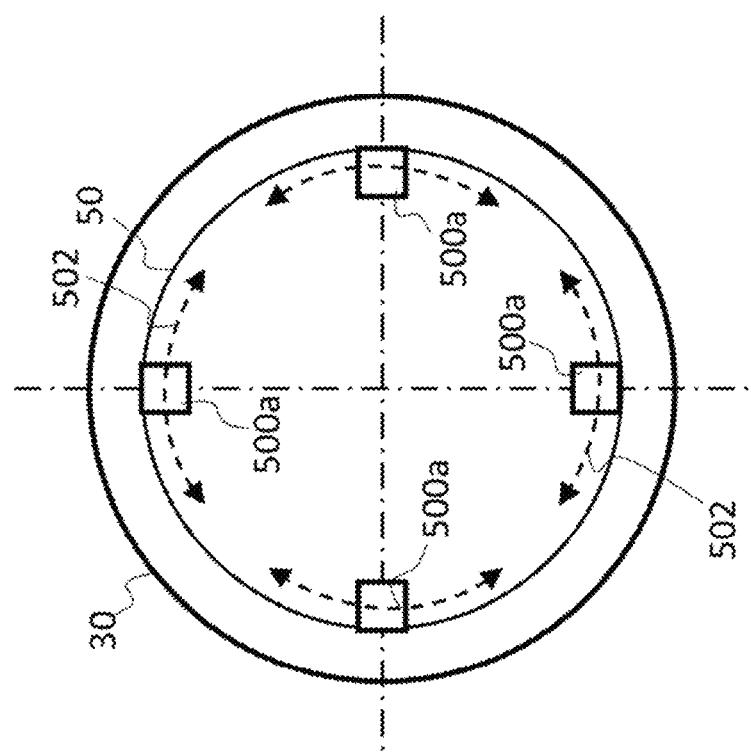
FIG. 12 is a cross-section taken along surface XII-XII of FIG. 11.
Figure 11:
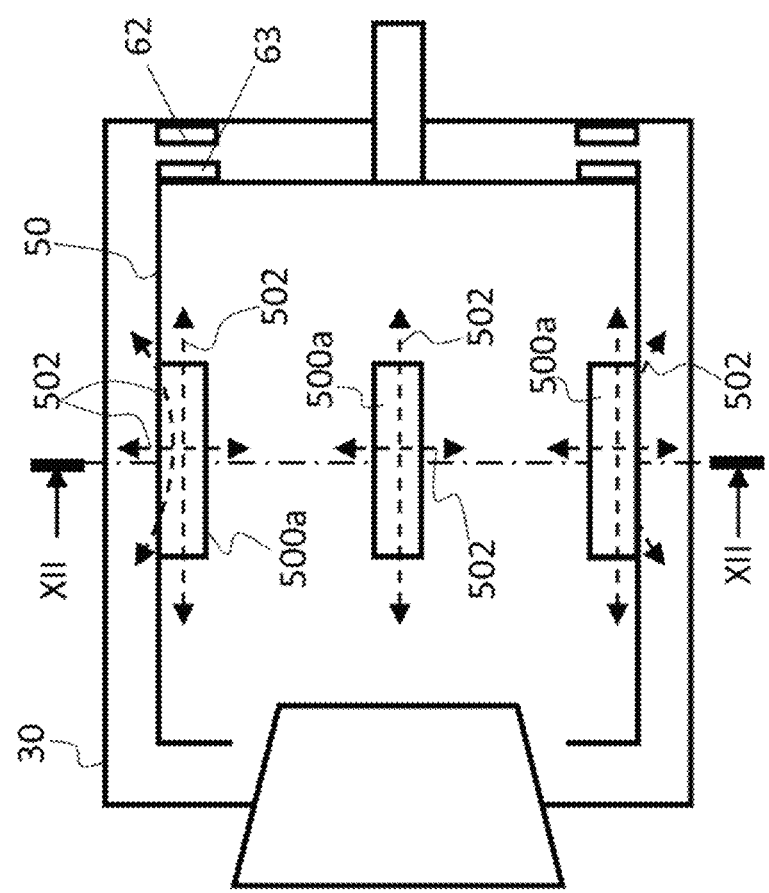
FIG. 11 is a schematic cross section of a tub and a drum of a further advantageous embodiment of a laundry treating apparatus according to the invention.

In the advantageous embodiment illustrated in FIGS. 11 and 12, the at least one of these one or more lifters 500a, preferably all of them, is movable with respect to the drum 50. Preferably, at least one of the one or more actuators 200 is associated to the movable lifter(s) for moving the latter with respect to the drum 50.

Figure 17:
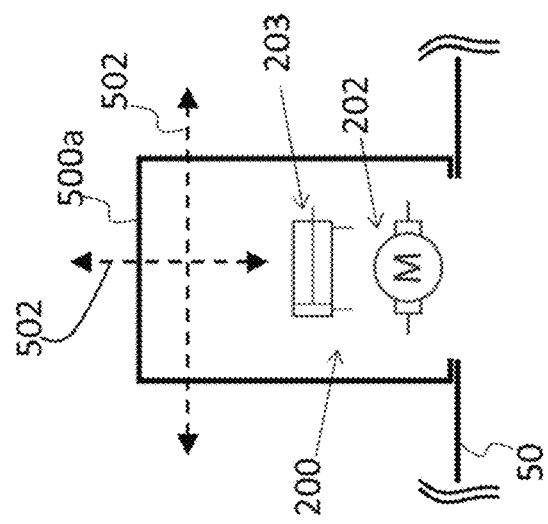
FIG. 17 is a schematic view of a second embodiment of a lifter of a laundry treating apparatus according to the invention.

A possible example of an electromechanical actuator 200 for moving a lifter 500a with respect to the drum 50 is schematically illustrated in FIG. 17; in this case the electromechanical actuator 200 can be for example an electric motor 202, and/or a pneumatic device 203, preferably housed within the lifter 500a, and suitable for moving the latter with respect to the drum 50.

Preferably, at least one lifter 500a, advantageously all of them, can be moved with respect to the drum 50 by a translation and/or a rotation; more preferably, at least one lifter 500a, advantageously all of them, can be moved with six degrees of freedom with respect to the drum 50.

In FIGS. 11a and 12, possible movements of the lifters 500a are schematically illustrated with dotted arrows 502.

Figure 14:
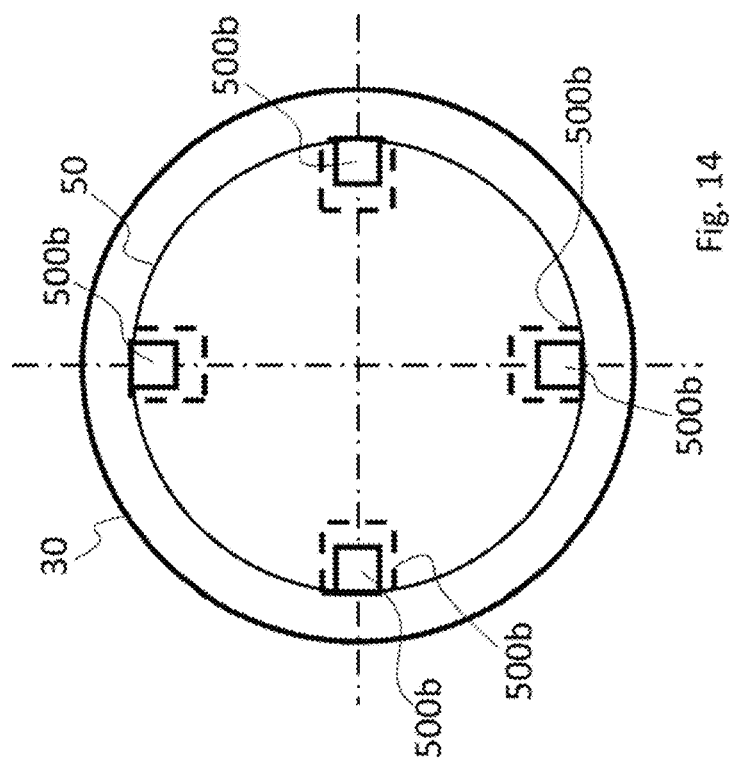
FIG. 14 is a cross-section taken along surface XIV-XIV of FIG. 13.
Figure 13:
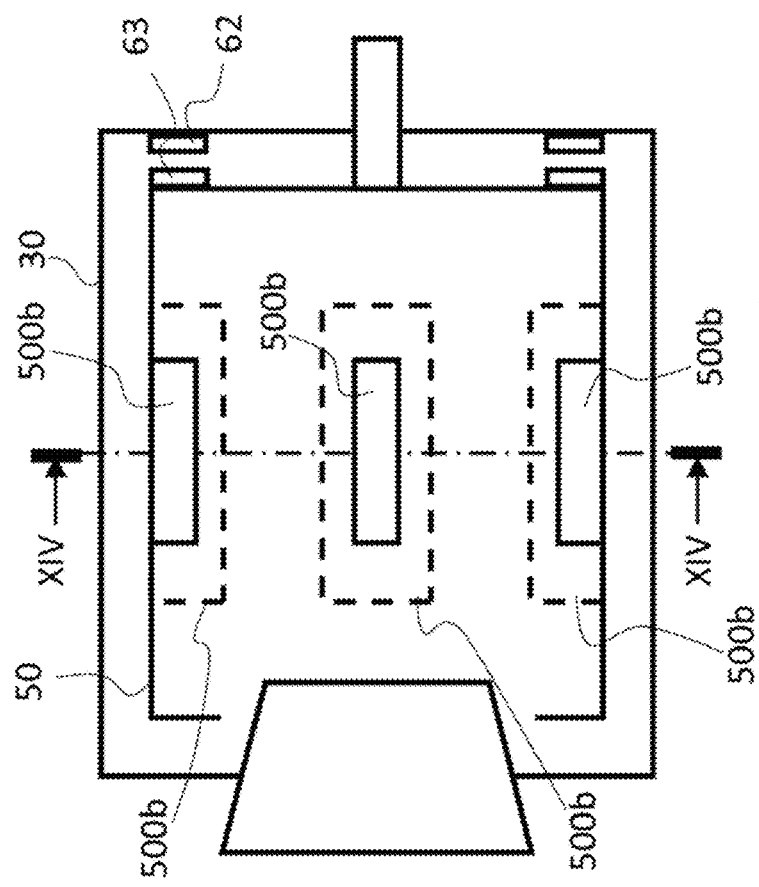
FIG. 13 is a schematic cross section of a tub and a drum of a further advantageous embodiment of a laundry treating apparatus according to the invention.

In a further advantageous embodiment, illustrated for example in FIGS. 13 and 14, at least one lifter 500b, preferably all of them, has a shape and/or volume that can be selectively modified by at least one electromechanical actuator 200.

Figure 16:
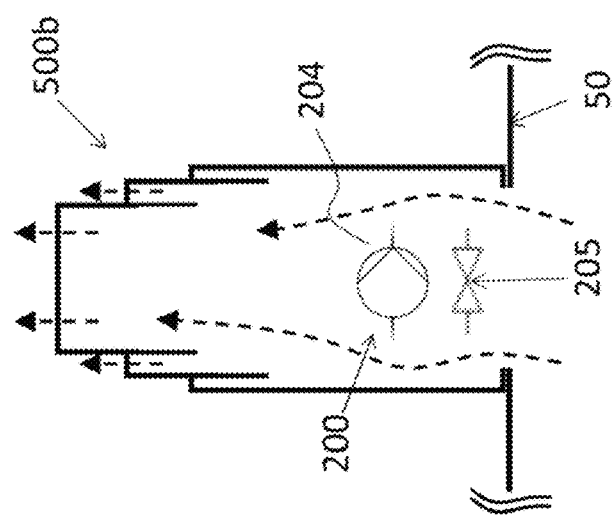
FIG. 16 is a schematic view of a first embodiment of a lifter of a laundry treating apparatus according to the invention.

For example, FIG. 16 shows an example of a lifter 500b which shape and volume can be modified by actuating an electromechanical actuator 200. In this case, the lifter 500b has preferably a hollow telescopic structure; an electromechanical actuator 200 is, preferably, housed within this lifter 500b, and is arranged for selectively actuating the telescopic extraction/insertion of the latter.

The electromechanical actuator 200 can be, for example, an assembly comprising a pump 204 and a discharge valve 205, or a linear motor, not illustrated.

In a further advantageous embodiment, not illustrated, at least one lifter 500b, advantageously all of them, can have a hollow structure and an elastically deformable external wall (for example made of elastic synthetic material), and an electromechanical actuator 200 (e.g. an electric linear motor, an assembly comprising a pump and a discharge valve, an electro-pneumatic actuator) can be housed, preferably, within this lifter, for selectively filling or emptying the latter with a fluid (a liquid, for example water, or a gas, for example air), so as to selectively increase/decrease its volume.

In FIGS. 13 and 14, the lifters 500b are schematically represented both in a condition of minimum volume (plane lines), and in a condition of maximum volumes (dotted lines).

Figure 18:
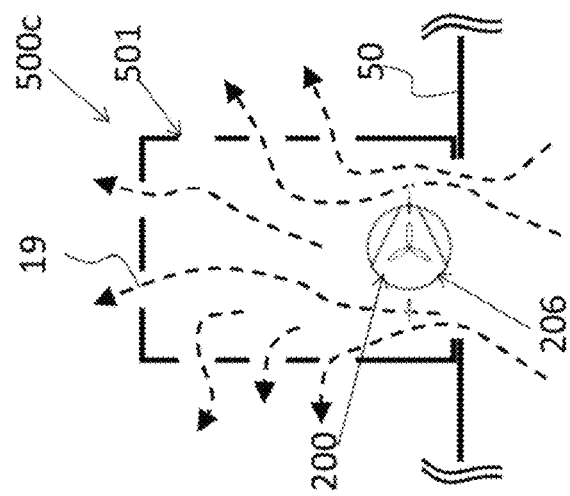
FIG. 18 is a schematic view of a third embodiment of a lifter of a laundry treating apparatus according to the invention.

In a further advantageous embodiment, illustrated for example in FIG. 18, at least one lifter 500c, advantageously all of them, can have a hollow shape and an at least partially perforated or air permeable surface 501; in this case at least one electromechanical actuator can comprise a fan or blower 206 housed within this hollow lifter 500c and arranged for generating an air flow, schematically illustrated with arrows 19, from the internal to the external of the lifter 500c. This embodiment can be helpful for example in case of a tumble drier 10b, for better distributing the heat within the laundry during the drying process, and obtaining a more uniform drying.

It is seen therefore how the invention achieves the proposed aim and objects, there being provided a laundry treating apparatus (e.g. a washing machine, a washer-drier, a tumble drier) which, thanks to the electromechanical actuators provided within the drum and wireless electrically supplied from the external of the latter, opens new possibilities of treating the laundry, using these actuators, in a more dedicated, localized and effective way.

The invention claimed is:

1. A laundry treating apparatus comprising:
   a cabinet,
   a drum rotatably housed inside the cabinet,
   a wireless power transmitter unit associated to the cabinet separately from the drum and arranged for wireless transmitting electric power to a wireless power receiver unit mounted in/on the drum, and
   one or more electromechanical actuators mounted in/on the drum and connected to receive power from the wireless power receiver unit, wherein:
   the wireless power transmitter unit comprises a transmission coil generating a magnetic field and the wireless power receiver unit comprises a reception coil generating power from the magnetic field generated by the transmission coil and supplying the generated power to the one or more electromechanical actuators,
   the transmission coil and the reception coil are aligned, centered and parallel in radial direction, and
   the transmission coil and the reception coil have a common radius dimension approximately equal to the drum external radius and are distanced in axial direction by a distance lower than their radius.

2. The laundry treating apparatus according to claim 1, wherein the one or more electromechanical actuators are connected by wires to the wireless power receiver unit.

3. The laundry treating apparatus according to claim 1, wherein the wireless power transmitter unit is electrically connected to an electric system of the laundry treating apparatus.

4. The laundry treating apparatus according to claim 1, wherein the laundry treating apparatus is a washing machine or a washer-drier, and wherein the cabinet houses a tub in which the drum is rotatably mounted, wherein the wireless power transmitter unit is mounted in/on the tub.

5. The laundry treating apparatus according to claim 4, wherein the power transmitter unit is fixed to the tub and the power receiver unit is fixed to the drum, with the power transmitter unit and the power receiver unit being positioned one opposite to the other and parallel in radial direction.

6. The laundry treating apparatus according to claim 1, wherein the laundry treating apparatus is a tumble drier, and wherein the cabinet comprises an air circuit for circulating heated air within the drum, and wherein the wireless power transmitter unit is mounted in/on a static or fixed part of the cabinet.

7. The laundry treating apparatus according to claim 1, further comprising a rotating element rotatably mounted inside the drum, wherein at least one of the one or more electromechanical actuators is configured to rotate the rotating element with respect to the drum.

8. The laundry treating apparatus according to claim 7, wherein at least one of the one or more electromechanical actuators comprises an electric motor mounted in/on the drum.

9. The laundry treating apparatus according to claim 8 wherein the rotating element faces a rear wall of the drum.

10. The laundry treating apparatus according to claim 7, wherein the rotating element comprises an agitator rotatably mounted inside and concentrically with the drum.

11. The laundry treating apparatus according to claim 10, wherein the agitator comprises a disk and one or more agitating blades protruding from a surface of the disk facing a central region of the drum.

12. The laundry treating apparatus according to claim 10, wherein the agitator comprises a bowl-shaped agitator element and one or more agitating ribs radially protruding from a lateral surface of the bowl-shaped element towards a central region of the bowl-shaped element.

13. The laundry treating apparatus according to claim 1, wherein the drum comprises one or more lifters protruding from a lateral surface of the drum towards an internal region of the drum.

14. The laundry treating apparatus according to claim 13, wherein at least one of the one or more lifters is movable with respect to the drum, and wherein at least one of the one or more electromechanical actuators is configured to move the at least one movable lifter with respect to the drum.

15. The laundry treating apparatus according to claim 14, wherein the at least one electromechanical actuator configured to move the at least one movable lifter is housed within the at least one movable lifter.

16. The laundry treating apparatus according to claim 14, wherein the at least one electromechanical actuator comprises an electric motor, and/or a pneumatic device.

17. The laundry treating apparatus according to claim 14, wherein the at least one movable lifter is movable with respect to the drum by a translation and/or a rotation.

18. The laundry treating apparatus according to claim 14, wherein the at least one movable lifter is movable with six degrees of freedom with respect to the drum.

19. The laundry treating apparatus according to claim 13, wherein at least one of the one or more lifters comprises a reconfigurable lifter having a shape and/or volume that can be selectively modified, and at least one of the one or more electromechanical actuators is configured to selectively modify the shape and/or volume of the reconfigurable lifter.

20. The laundry treating apparatus according to claim 19, wherein the at least one electromechanical actuator configured to selectively modify the shape and/or volume of the reconfigurable lifter is housed within the reconfigurable lifter.

21. The laundry treating apparatus according to claim 19, wherein the at least one electromechanical actuator configured to selectively modify the shape and/or volume of the reconfigurable lifter comprises a linear actuator and/or a pneumatic actuator, and or pump and/or a valve and/or an endless screw.

22. The laundry treating apparatus according to claim 19, wherein the at least one reconfigurable lifter comprises a hollow telescopic structure having a first part that slides within a second part, and wherein the at least one electromechanical actuator is configured to selectively move the first part telescopically with respect to the second part.

23. The laundry treating apparatus according to claim 19, wherein the reconfigurable lifter has a hollow structure and an elastically deformable external wall, the elastically deformable external wall being configured to be selectively and reversibly enlarged by the least one electromechanical actuator.

24. The laundry treating apparatus according to claim 23, wherein the at least one electromechanical actuator is configured to selectively and reversibly enlarge the elastically deformable external wall by selectively filling or emptying the reconfigurable lifter with a fluid.

25. The laundry treating apparatus according to claim 13, wherein at least one of the one or more lifters has a hollow shape and an at least partially perforated or air permeable surface, and wherein and at least one of the one or more electromechanical actuators comprises a fan or blower housed within the hollow lifter and configured to generate an air flow from the internal to the external of the at least one lifter.

26. The laundry treating apparatus according to claim 1, wherein the wireless power receiver unit comprises at least two reception coils and the one or more electromechanical actuators comprise at least two electromechanical actuators, and a respective one of the at least two reception coils is configured to supply electricity to a respective one of the at least two electromechanical actuators.

27. A laundry treating apparatus comprising:
a cabinet,
a drum rotatably housed inside the cabinet, the drum including one or more lifters protruding from a lateral surface of the drum towards an internal region of the drum, wherein at least one of the one or more lifters is movable with respect to the drum,
a wireless power transmitter unit associated to the cabinet separately from the drum and arranged for wireless transmitting electric power to a wireless power receiver unit mounted in/on the drum, and
one or more electromechanical actuators mounted in/on the drum and connected to receive power from the wireless power receiver unites, wherein at least one of the one or more electromechanical actuators is configured to move the at least one movable lifter with respect to the drum.

28. A laundry treating apparatus comprising:
a cabinet,
a drum rotatably housed inside the cabinet, the drum including one or more lifters protruding from a lateral surface of the drum towards an internal region of the drum, wherein at least one of the one or more lifters comprises a reconfigurable lifter having a shape and/or volume that can be selectively modified,
a wireless power transmitter unit associated to the cabinet separately from the drum and arranged for wireless transmitting electric power to a wireless power receiver unit mounted in/on the drum, and
one or more electromechanical actuators mounted in/on the drum and connected to receive power from the wireless power receiver unites, wherein at least one of the one or more electromechanical actuators is configured to selectively modify the shape and/or volume of the reconfigurable lifter.

* * * * *